United States Patent [19]
Gengler et al.

[11] Patent Number: 5,231,385
[45] Date of Patent: Jul. 27, 1993

[54] BLENDING/COMPARING DIGITAL IMAGES FROM DIFFERENT DISPLAY WINDOW ON A PER-PIXEL BASIS

[75] Inventors: Joel D. Gengler, Boulder; Brad D. Reak, Loveland, both of Colo.

[73] Assignee: Hewlett-Packard Company, Palo Alto, Calif.

[21] Appl. No.: 648,265

[22] Filed: Jan. 31, 1991

Related U.S. Application Data

[63] Continuation-in-part of Ser. No. 494,031, Mar. 14, 1990.

[51] Int. Cl.⁵ .............................................. G09G 1/28
[52] U.S. Cl. ..................................... 340/703; 340/723
[58] Field of Search ................ 340/703, 723, 721; 358/22, 182

[56] References Cited

U.S. PATENT DOCUMENTS

| | | | |
|---|---|---|---|
| 2,964,589 | 12/1960 | Walker | 358/182 |
| 4,149,184 | 4/1979 | Giddings et al. | 340/703 |
| 4,542,376 | 9/1985 | Bass et al. | 340/723 |
| 4,704,605 | 11/1987 | Edelson | 340/703 |

Primary Examiner—Ulysses Weldon
Assistant Examiner—Matthew Luu

[57] ABSTRACT

A digital image blending/comparison circuit which lets a user draw several planar images and then sum them together with a scalable "blend" function or subtract them and display the difference image. An image frame buffer is subdivided to store multiple images provided by the user, and the resulting multiple images are combined as a single image within a display window on a pixel by pixel basis during a blending mode or subtracted within a display window on a pixel by pixel basis in a comparison mode. During the blending mode, the invention sums the pixel color data on a per-pixel basis, where the pixel data is scaled as a separate operation on color map entries. However, during the comparison mode, the invention subtracts the pixel color data on a per-pixel basis and scales the difference image signal so that it is perceptible on the display. Control information is fed to the circuit of the invention on pixel boundaries from the frame buffer, and the circuit of the invention responds to combine or compare the images in accordance with the preferences of the user. As a result, each display pixel may selectively show a single image, a combined image or a difference image from the associated window. The invention also allows for separate processing of data within each window by defining each pixel with respect to its window boundaries.

16 Claims, 3 Drawing Sheets

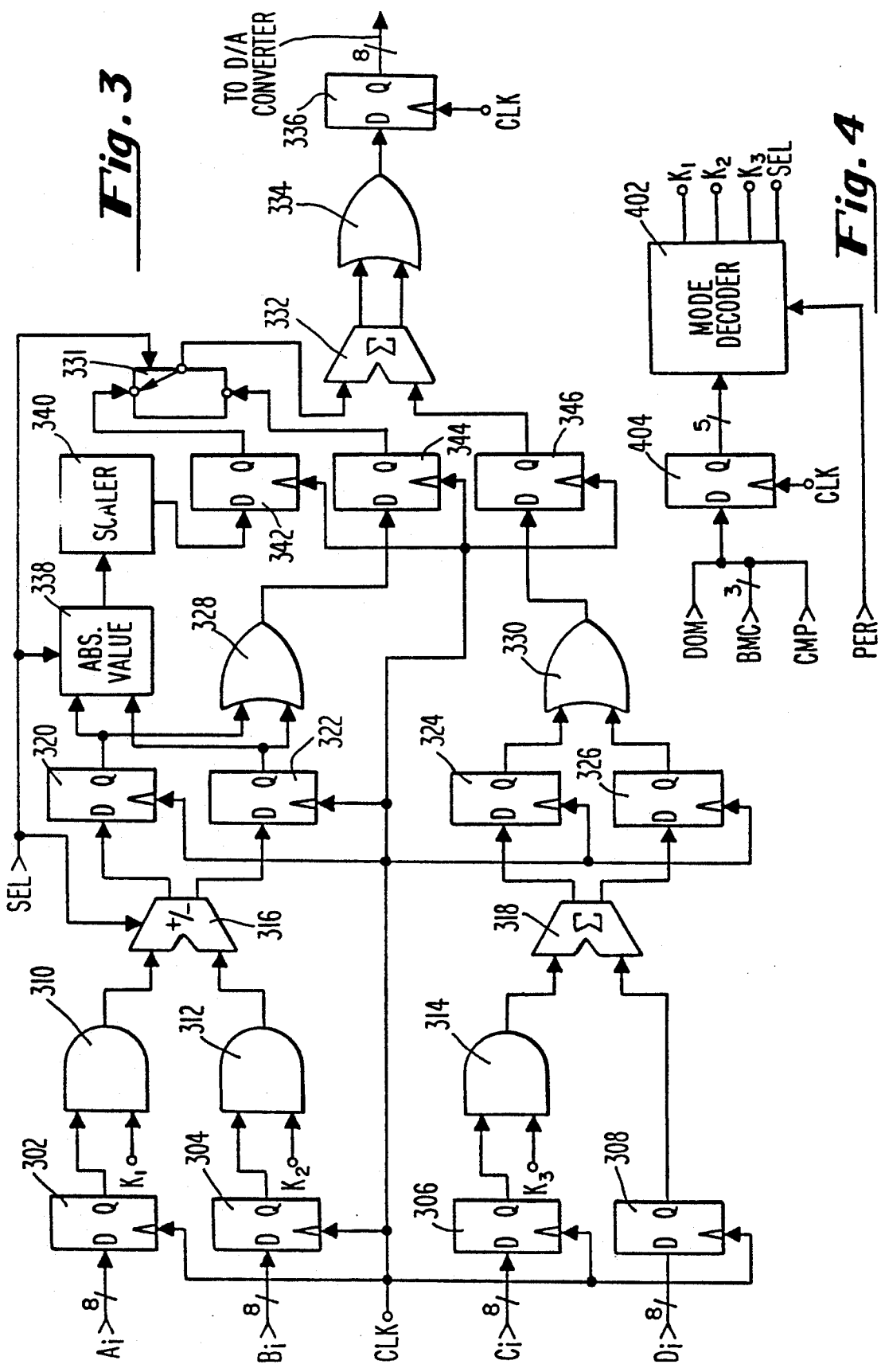

BLENDING/COMPARING DIGITAL IMAGES FROM DIFFERENT DISPLAY WINDOW ON A PER-PIXEL BASIS

CROSS-REFERENCE TO RELATED APPLICATION

The present application is a continuation-in-part of U.S. application Ser. No. 07/494,031 filed Mar. 14, 1990 by Gengler et al., entitled "Digital Image Blending on a Per-Pixel Basis", the contents of which are hereby incorporated by reference.

BACKGROUND OF THE INVENTION

1. Field Of The Invention

The present invention relates to raster scanned video display devices, and more particularly, to a method and apparatus for selectively blending or comparing two or more digital images on a pixel by pixel basis and displaying the results on a display monitor.

2 Description Of The Prior Art

Typically, image data for display on a raster scanned display device is stored in a circuit called a frame buffer. The frame buffer is preferably wide enough to accommodate the largest image display mode. Typical frame buffer widths are 8, 16 or 24 planes, where a plane is normally one bit of information wide. The raster images are drawn by processing the data value stored in the frame buffer to arrive at values suitable for display.

For example, as shown in FIG. 1, an image frame buffer 102 having 24 planes of information and three bits of window/overlay plane information may provide its outputs to display mode controller 104, where a display mode, such as full color, eight-bit indexed, and the like is determined. The data output of the display mode controller 104 is typically post-processed in another device called a color map, also known as a color table, color look-up table or color ROM. As shown, a different color map may be provided for the red (106), green (108) and blue (110) colors. The outputs from the display mode controller 104 are typically provided as indices to the respective color maps, and for the eight plane system shown, $2^8 (=256)$ intensity values for red and for green and for blue may be respectively provided. Thus, the color intensity values stored in the color maps are accessed for one or more adjacent pixels by using the inputted planes as indices to these intensity values and then outputting the result.

Each color map thus translates the image data into component colors, which are normally, but not necessarily, red, green and blue (RGB). Often data from the image frame buffer 102 is also multiplexed into the color maps to create different display modes by display mode controller 104. Most display devices then use the output of the color maps to feed the input of three digital to analog converters 112, 114 and 116, respectively, to obtain an RGB analog video signal which is then used to drive the video display unit. Of course, for a monochrome display, only one digital to analog converter is necessary.

In such raster scanned frame buffers, it has often been desirable to segment the frame buffer 102 into regions of interest called "windows". Separate and independent windows have been used to provide independent modes of display. Normally, the window regions within the image frame buffer 102 are identified by extending the frame buffer width another three or four planes as shown in FIG. 1 to allow for a tag field, by which each display region may be identified. A tag field of three planes allows for eight unique windows, Where a tag field of four planes allows for sixteen unique window regions.

When it has been desired to combine a plurality of images output from display circuits of the type shown in FIG. 1, the analog RGB outputs of each circuit are added together before being input to the video display unit. In particular, analog RGB outputs for each image to be displayed are summed in an analog adder and then clamped at a predetermined level so as not to oversaturate the video display device. This combining occurs during scanning in order to achieve the proper result.

However, the prior art technique of combining the analog RGB signals for display in this manner has numerous drawbacks. In particular, since the blending occurs after the digital to analog conversion, the blending is difficult to achieve on a pixel by pixel basis, and accordingly, window boundaries may not be properly distinguished for display. Moreover, only one color map is provided for the entire display device, and thus separate color maps for each image may not be provided. In addition, the prior art technique has problems in that the digital to analog converters must be matched to each other or else intensity changes will occur between respective images. Blending of the signals in this manner also causes bandwidth problems, for since processing is performed in analog the summing amplifier must have extremely high bandwidths.

Similarly, when it has been desired to compare images output from display circuits of the type shown in FIG. 1, the analog RGB outputs of each circuit are subtracted from each other before being input into the video display unit. In particular, analog RGB outputs for each image to be compared are subtracted from each other in an analog subtractor and the difference is displayed during scanning. However, as with image blending, such comparison is difficult to achieve on a pixel by pixel basis.

Accordingly, there is a need in the art for a process and apparatus which enables images to be selectively blended or compared on a pixel by pixel basis so that the result can be displayed. In addition, there is a need in the art for a process and apparatus which compares input images on a per pixel basis to determine the differences therebetween and which can overlay this image on one of the original images to show where in that original image it differs from the other image. The present invention has been designed for these purposes.

SUMMARY OF THE INVENTION

The above-mentioned needs in the art have been met in accordance with the present invention, which relates to a method and apparatus for subdividing a frame buffer, along window plane boundaries, into multiple images which are then processed through independent color maps and blended or compared for display on arbitrary window boundaries. Each window region may be configured, for example, via software such that the window regions are independent, and image blending or comparison can be on or off with no loss of frame buffer capability to other window regions. In other words, separate image regions may be defined and overlayed or compared where one image is dominant and where the differences between two or more images may be seen at each point. For example, two or more input images may be compared on a per pixel basis to determine the differences therebetween, and this difference image can be overlayed on one of the original images to show where in that original image it differs from the other image or images.

In accordance with the invention, a device is provided for comparing at least two digital images on a pixel by pixel basis for display of a difference image on a display device. Such a device in accordance with the invention preferably comprises means for providing the at least two digital images for display, means for subtracting the digital images on a pixel by pixel basis to produce the difference image and means for converting the difference image into an analog signal for display on the display device. Preferably, the providing means comprises an image frame buffer Which is subdivided, along display window boundaries, into the at least two digital images for display. Also, the at least two digital images are preferably in the same display window of the display device. The providing means may also comprise a display mode controller for providing separate modes of display for each display window and at least one color map for each display window for translating digital representations of the digital images into component colors of the digital images.

In accordance with a preferred embodiment of the invention, the subtracting means comprises a comparator for each of the component colors. Each comparator subtracts a component color from a first digital image from the same component color of a second digital image for each component color on a pixel by pixel basis. For this purpose, each comparator comprises a subtractor for subtracting corresponding pixels of the same color component of the first digital image from the second digital image, an absolute value circuit for calculating the absolute value of the difference of the first and second digital images and scaling means for accentuating the difference for display.

The scope of the invention also includes a device for selectively blending at least two digital images on a pixel by pixel basis for display on a display device in a blend mode and for comparing the at least two digital images on a pixel by pixel basis for display of a difference image on the display device in a compare mode. Such a device in accordance with the invention preferably comprises means for providing the at least two digital images for display, means for adding the digital images on a pixel by pixel basis in accordance with a blending mode signal specified by a viewer of the display device in the blend mode and for subtracting the digital images on a pixel by pixel basis to produce the difference image in the compare mode and means for converting an output of the adding and subtracting means into an analog signal for display on the display device. Preferably, such adding and subtracting means comprises a blender/comparator for each of the component colors. Each blender/comparator blends a component color from a first digital image with the same component color of a second digital image into a sum for each component color on a pixel by pixel basis in accordance with the blending mode signal when in the blend mode and subtracts the component color from the first digital image from the same component color of the second digital image to produce the difference image for each component color on a pixel by pixel basis when in the compare mode.

In a particular embodiment, each blender/comparator comprises blender circuitry including a digital logic circuit for passing each digital image to an output if so specified by the blending mode signal, pixel adding means for adding corresponding pixels of the same color component from each digital image which is to be passed to the output, and clamping means for clamping a sum output of the pixel adding means to prevent oversaturation of the resulting image. In addition, each blender/comparator preferably comprises comparator circuitry including a subtractor for subtracting corresponding pixels of the same color component of the first digital image from the second digital image, an absolute value circuit for calculating the absolute value of the difference of the first and second digital images and scaling means for accentuating the difference for display. Such circuitry may also include a switch for selecting the blender circuitry for processing the digital images in the blend mode and for selecting the comparator circuitry for processing the digital images in the compare mode. A mode decoder may also be provided for providing the blending mode signal to the digital logic circuit in the blend mode and for providing a select signal to the switch for selecting the blender circuitry in the blend mode and the comparator circuitry in the compare mode.

The scope of the invention further includes a method of comparing at least two digital images on a pixel by pixel basis for display of a difference image on a display device. Such a method in accordance with the invention preferably comprises the steps of providing the at least two digital images for display, subtracting the digital images on a pixel by pixel basis to produce the difference image and converting the difference image into an analog signal for display on the display device. Preferably, the subtracting step comprises the steps of subtracting corresponding pixels of the same color component of a first digital image from a second digital image, calculating the absolute value of the difference of the first and second digital images and accentuating the difference for display.

The invention further includes a method of selectively blending at least two digital images on a pixel by pixel basis for display on a display device in a blend mode and for comparing the at least two digital images on a pixel by pixel basis for display of a difference image on the display device in a compare mode. Such a method preferably comprises the steps of providing the at least two digital images for display, adding the digital images on a pixel by pixel basis in accordance with a blending mode signal specified by a viewer of the display device in the blend mode, subtracting the digital images on a pixel by pixel basis to produce the difference image in the compare mode and converting a result of the adding and subtracting steps into an analog signal for display on the display device. Preferably, such a subtracting step comprises the steps of subtracting corresponding pixels of the same color component of a first digital image from a second digital image, calculating the absolute value of the difference of the first and second digital images and accentuating the difference for display.

These and other features of the invention enable the invention to provide images which may be distinguished on window boundaries for display and to allow separate processing for the images in separate windows. Moreover, no intensity adjustments are necessary since the image blending and comparison are done in digital form, and as a result, improved processing speed is possible. These and other features of the invention will be made more clear from the following detailed description.

BRIEF DESCRIPTION OF THE DRAWINGS

The objects and advantages of the invention will become more apparent and more readily appreciated from the following detailed description of the presently preferred exemplary embodiment of the invention take in conjunction with the accompanying drawings, of which:

FIG. 3 schematically illustrates a block diagram of a preferred embodiment of a blending/comparison circuit of the type shown in FIG. 2 in accordance with the invention.

FIG. 4 schematically illustrates a mode decoder which provides control signals to the digital image blending/comparison circuits of FIGS. 2 and 3 in accordance with the invention.

DETAILED DESCRIPTION OF THE PRESENTLY PREFERRED EXEMPLARY EMBODIMENT

The inventors of the subject matter disclosed and claimed herein have satisfied the above-mentioned needs in the art by developing a digital image blending/comparison technique which lets a user blend several window images plus an additional cursor or overlay image using overlay planes by summing the images using a scalable blend function so as to provide a more versatile display or compare two or more window images on a pixel-by-pixel basis for display of a difference image. Such a blender/comparator may be responsible only for the summation/comparison of pixel color data, where the actual scaling may be done as a separate operation on color map entries. Such "image blending" is defined for the purpose of this application as the summation of like colors from different color maps, while "image comparison" is defined for the purpose of this application as determining the difference image between different images. For example, eight bits of red intensity information from four different color maps may be summed or subtracted and then clamped to produce a total red intensity level. Green and blue values are treated in a like manner during blending and comparison. Image intensity scaling is thus accomplished by scaling data in the color maps to achieve the desired visual effect.

A digital image blender/comparator device with the above-mentioned beneficial features in accordance with a presently preferred exemplary embodiment of the invention will now be described with reference to FIGS. 2-4. It will be appreciated by those of ordinary skill in the art that the description given herein is for exemplary purposes only and is not intended in any way to limit the scope of the invention. All questions regarding the scope of the invention may be resolved by referring to the appended claims.

Figure 1:
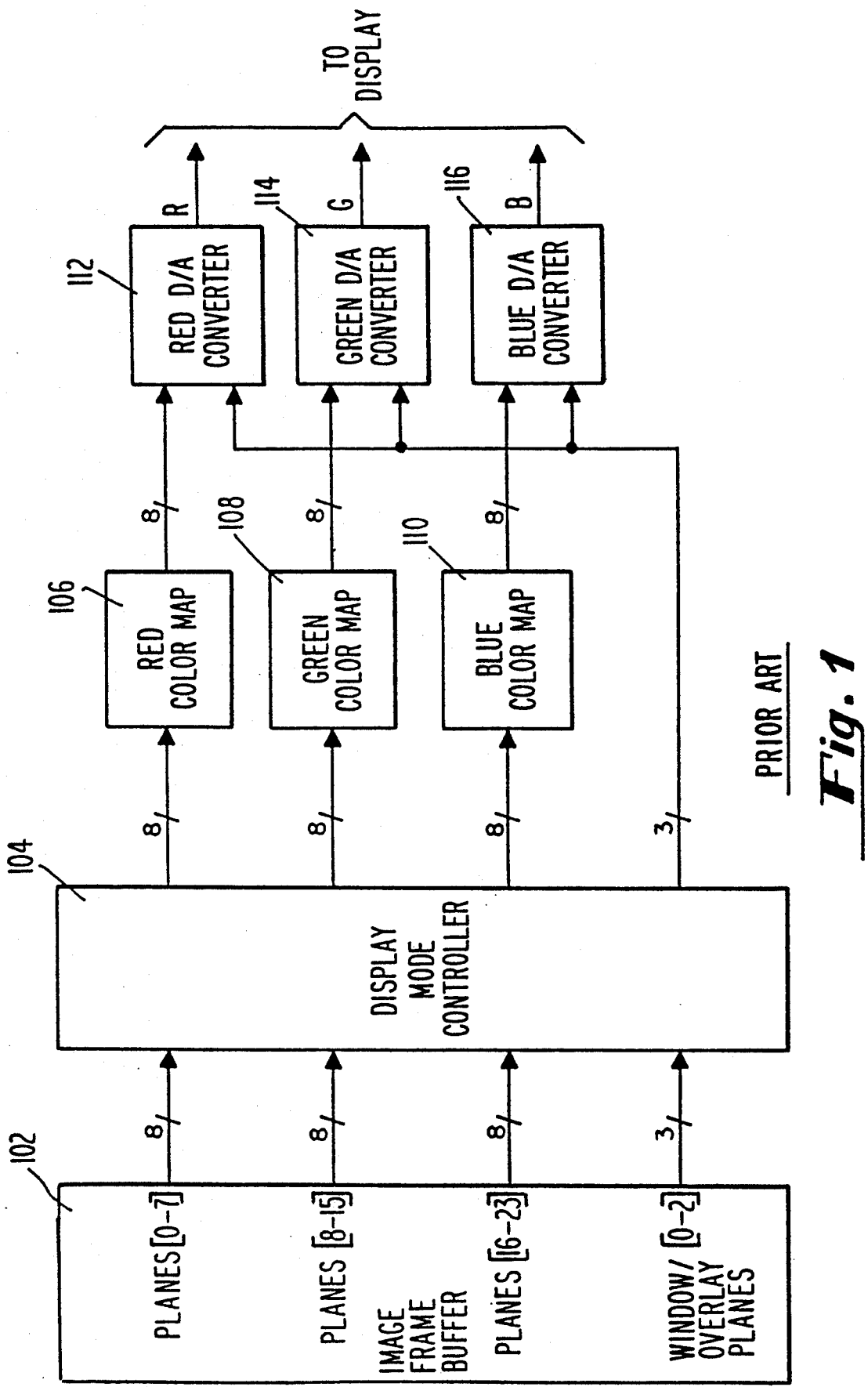
FIG. 1 schematically illustrates a prior art color display sub-system.
Figure 2:
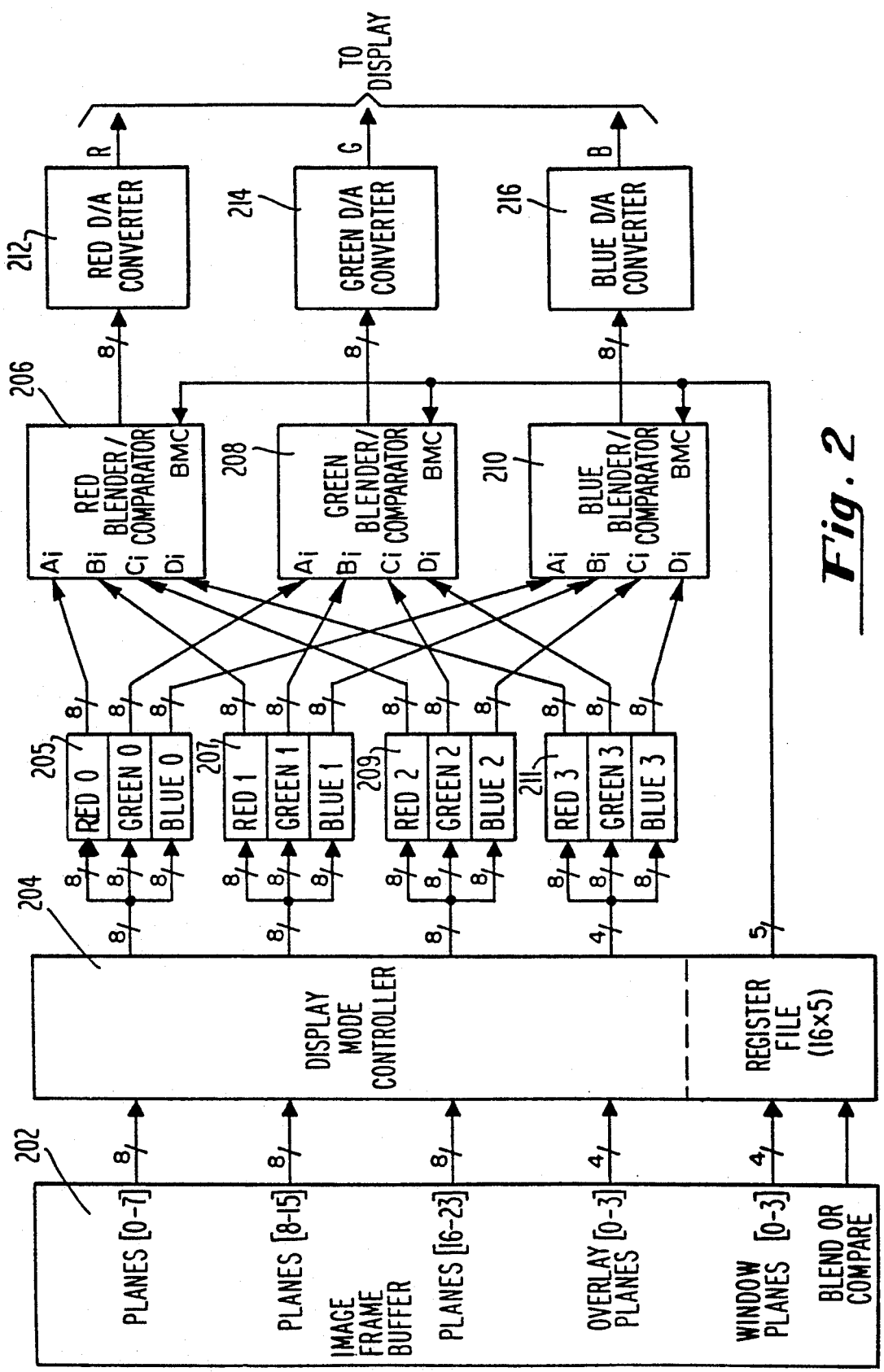
FIG. 2 schematically illustrates an improved display sub-system incorporating a digital image blending/comparison circuit in accordance with the invention.

FIG. 2 shows the digital image blending/comparison circuit in accordance with the invention. As with the prior art color display sub-system of FIG. 1, the circuit of FIG. 2 includes an image frame buffer 202, a display mode controller 204 and D/A converters 212, 214 and 216 for each color output. As shown, the image frame buffer 202 of the circuit of FIG. 2 allows up to 24 image planes in groups of eight to be output for display. In accordance with the invention, these planes may be developed by partitioning the image frame buffer 202 into groups of eight planes, whereby each group of eight planes represents one image (rather than having one 24 plane image as when no blending or comparison occurs). As noted above, each plane is one bit deep, and the number of planes determines the number of colors available as previously described. For example, given a group of eight image planes for each image, 256 colors are available for each image. As before, these images may be outputted to display mode controller 204 for creating different display modes such as full color, eight bit indexed, and the like.

As shown in FIG. 2, the image blending/comparison circuit in accordance with the invention may be implemented within the context of four relatively standard color maps 205, 207, 209 and 211. Each of the color maps may be addressed with the indices of each image for providing the corresponding red, green and blue output values, which are then output to the corresponding blending/comparison circuits of the invention. Blending/comparison circuits 206, 208 and 210 are installed between the outputs of the color maps and the input of digital to analog converters 212, 214 and 216 as shown. Therefore, each of the blender/comparison circuits 206, 208 and 210 are used for each color map data path, where each blender/comparator corresponds to a component color such as red, green or blue, as determined by a personality bit PER to be described below. As can be seen from FIG. 2, each blender/comparator may have an 8-bit connection to each color table 205, 207, 209 and 211 at respective outputs corresponding to the red, green or blue table sections.

Each blender/comparator has four separate 8-bit inputs, labelled $A_i$ through $D_i$, 5-bits of control information labelled BMC, and two bits of personality information labelled PER. $A_i$ is an 8-bit input which is provided for respective color inputs for an "A" image, while $B_i$ and $C_i$ are the respective color inputs for the "B" and "C" images. The $D_i$ input, on the other hand, is provided for an overlay image formed from the four overlay planes from image frame buffer 202. The $D_i$ input is thus comprised of image data from the overlay/cursor color map 211. The BMC input is the mode control input which selects whether blending or comparison is to be performed (CMP is 0 or 1) and which of the A, B, and C images are to be added to the overlay/cursor image at input D during blending or subtracted from each other during image comparison. PER corresponds to the personality bits of each blender/comparator which determine whether the particular blender/comparator is a red, green or blue blender/comparator. A DOM bit also may be provided for certain pixels to specify whether the overlay/cursor is to be dominant, or, in other words, to instruct the blender/comparator to ignore the mode control provided by the BMC and personality PER to pass only the overlay/cursor image to the output at a corresponding display point. Such bits may be used, for example, to outline a window on the display screen.

The mode control (BMC) input to each blender/comparator is driven by the window planes provided from image frame buffer 202, the planes being translated through a window register file of appropriate size in the display mode controller 204. The image frame buffer 202 can also specify whether the output is to be displayed in the blend or compare mode. As shown in FIG. 2, the window register file may be implemented as 16 words by five bits for translating window tag bits and the blend or compare signal to BMC inputs. The window register file may be used to specify how to process each pixel within each window by specifying a different display mode for different windows of the display device. This is done by giving different BMC values to each window to be rendered on the display device. The window register file thus enables images within each window to be processed concurrently.

As will be described in more detail below with respect to FIG. 4, the user may select any combination of inputs to each of the blender/comparator circuits under software control by altering the values in the window register files corresponding to the region of interest. The invention thus allows the display system to behave as would a typical single color map display system; however, the invention also provides the ability to sum or subtract output data from separate color maps to create a composite image including the sum or difference of several windows, for example.

The blender/comparator circuits will now be described in more detail with respect to FIG. 3. FIG. 3 shows an example of a blender/comparator circuit in accordance with the invention which is configured to allow compositing and clamping and comparison of input image data. As shown, each image blender/comparator latches all input data for inputs $A_i$, $B_i$, $C_i$, and $D_i$ at latches 302, 304, 306 and 308, respectively, using a clock signal CLK which has a timing equal to one pixel duration. All data except the data on input $D_i$ is then passed through a stage of AND gates 310, 312 and 314, respectively. The gates are driven by combinational logic controlled by the BMC inputs and the blender/comparator personality PER data inputs, respectively, as will be described in more detail below with respect to Table 1 and FIG. 4. The sums of the processed inputs ($A_i+B_i$+carry out) and ($C_i+D_i$+carry out) are then determined in adder/subtractor 316 and summer 318 during a blending mode. The respective outputs of the adder/subtractor 316 and summer 318 are then latched by latches 320, 322, 324 and 326, respectively, and the outputs of the latches are then clamped at OR circuits 328 and 330 to prevent the sums of adder/subtractor 316 and summer 318 from exceeding the eight-bit value 255 by ORing the carry outs of the adders with the sums. In other words, $A_i+B_i$ and $C_i+E_i$ are separately clamped to no more than 255 ($<2^8$). The sum $A_i+B_i$ then passes through a switch 331 which is set by SEL from mode decoder 402 (FIG. 4) to receive the output of OR circuit 328 in the blending mode. The sums of $A_i+B_i$ and $C_i+D_i$ are then determined at adder 332, and the result is clamped at OR circuit 334 to prevent the output from exceeding the 8-bit value 255 by ORing the carry out of adder 332 with the sum. In other words, $A_i+B_i+C_i+D_i$ must be less than 255. The result is then piped to the output by latch 336.

Thus, the $A_i$, $B_i$, $C_i$ and overlay/cursor image data $D_i$, as well as the mode and the dominance bits may be latched into the blending circuits by the CLK signals during the blending mode in accordance with the invention. During the blending mode, the blender/comparator accepts the input data for one pixel every CLK cycle. Then the blended output result for each pixel is determined by the mode (BMC), the dominance (DOM) and personality (PER) inputs for the blending mode (CMP=0) as shown in the following TABLE 1:

TABLE 1

| BMC > 0 | | | BMC = 0 | | |
|---|---|---|---|---|---|
| BMC | DOM = 0 | DOM = 1 | PER | DOM = 0 | DOM = 1 |
| 1 | A + D | D | 0 | A + D | D |
| 2 | B + D | D | 1 | B + D | D |
| 3 | A + B + D | D | 2 | C + D | D |
| 4 | C + D | D | 3 | x | D |
| 5 | A + C + D | D | | | |
| 6 | B + C + D | D | | | |
| 7 | A + B + C + D | D | | | |

During the blending mode, the present embodiment of the invention thus allows for compositing of up to four separate images from among four different images which are drawn from different portions of the frame buffer 202 on a per pixel (window oriented) basis, although in other embodiments additional images may be composited by further subdividing the image frame buffer and providing additional hardware in accordance with the invention. As can be seen from FIG. 3, the output stage of the digital image blender/comparator during the blending mode is really the quantity $A_i+B_i+C_i+D_i$ where the values $A_i$, $B_i$ and $C_i$ may be driven to 0 by the BMC inputs in accordance with the values of $k_1$, $k_2$ and $k_3$. This functionality allows the image to take on discrete values from $D_i$ through $A_i+B_i+C_i+D_i$ as long as the sum does not exceed 255.

In particular, as shown in TABLE 1 and in FIG. 4, mode decoder 402 of the invention may select whether to display a given image by appropriately providing 0 or 1 outputs for $k_1$, $k_2$ and $k_3$. For each mode decoder 402 of each blender/comparator, the color of the associated blender/comparator is determined by the personality bits PER, and "zero" is provided for one of the bits $k_1, k_2$ and $k_3$ if the corresponding input image is not to be shown on the screen, while a "one" is output for one of the k values if the corresponding image is to be blended or compared for display. This is determined by the values of BMC and DOM as shown in TABLE 1, which are latched to mode decoder 402 via latch 404 as shown in FIG. 4. As noted above, these values may determine whether to display particular overlay input planes for up to 16 window overlays, whereby the pixels in some windows may be blended or compared but not in others. In addition, the value of DOM specifies whether a given image is to have dominance over the other images such that only the pixels for that particular image are displayed whereas the pixel values for the other images are not displayed at the corresponding display pixel. As noted above, such is preferable for use in defining the boundaries around the windows.

A digital image comparison mode for the circuit of FIG. 3 may be selected by appropriately setting the flag CMP to specify the compare mode. CMP is passed through the mode decoder as shown in FIG. 4 and provided to the circuit of FIG. 3 as SEL to change processing modes. In particular, SEL instructs adder/subtractor 316 to subtract its inputs and enables the path through absolute value circuit 338 via switch 331. Switch 331 is thus set to receive the output of absolute value circuit 338 when the circuit is in the compare mode.

During the compare mode, input digital images $A_i$ and $B_i$ are compared by setting $K_1=K_2=1$, setting $K_3$ independently and setting adder/subtractor 316 to its subtract mode using flag SEL. The difference in the images is then passed from adder/subtractor 316 through latches 320 and 322 to absolute value circuit 338. If the difference between the inputs $A_i$ and $B_i$ is non-zero, the difference image is then scaled by scaler circuit 340 to accentuate the differences between the images for display purposes. Scaler circuit 340 does this by either left shifting the result or by generating maximum intensity for any non-zero difference. The result is then output through latch 342 to switch 331, and the difference image is passed through adder 332 (where it can be blended with images $C_i$ and $D_i$), through OR circuit 334 and through latch 336 for display as described above. Latches 344 and 346 are also preferably provided after OR circuits 328 and 330 to keep pipeline stages equal. As with the blending mode, control is thus provided on a per-pixel basis so that different comparisons may take place in different Windows. This processing may also be accomplished on a per-window basis as desired.

Different displays are possible in the comparison mode in accordance with the value of $K_3$ and the $C_i$ and $D_i$ inputs. For example, if $K_3=0$, only the difference image (A−B) plus cursor image $D_i$ is displayed. However, if $K_3=1$ and input image $C_i$ is the A or B image, the difference image may be optionally duplicated on either the original A or B image so that the displayed image is actually the difference image (A−B) blended with one of the original images. Such a display is useful in showing where the differences between the A and B images occur.

Although an exemplary embodiment of the invention has been described in detail above, those skilled in the art will readily appreciate that many additional modifications are possible in the exemplary embodiments without materially departing from the novel teachings and advantages of the invention. For example, the mode controller could be modified to allow subtractor 316 to clamp the difference between respective images $A_i$ and $B_i$ to the minimum intensity value and to overflow the subtract by getting the maximum intensity if the subtracted image is slightly more intense than the base image. Accordingly, all such modifications are intended to be included within the scope of this invention as defined in the following claims.

What is claimed:

1. A device for comparing at least two digital images within different display windows of a display device on a pixel by pixel basis and displaying a difference image within a display window of said display device, comprising:

an image frame buffer which is subdivided along window display boundaries into said at least two digital images for display in different display windows of said display device;

at least one color map for each display window for translating digital representations of said digital images into component colors of said digital images;

means for subtracting said component colors of said digital images on a pixel by pixel basis to produce said difference image; and means for converting said difference image into an analog signal for display in said display window of said display device.

2. A device as in claim 1, wherein said display window in which said difference image is displayed is one of said different display windows.

3. A device as in claim 1, further comprising a display mode controller for providing separate modes of display for each display window of said display device.

4. A device as in claim 1, wherein said subtracting means comprises a comparator for each of said component colors, each comparator subtracting a component color of a first digital image from the same component color of a second digital image for each component color on a pixel by pixel basis.

5. A device as in claim 4, wherein each comparator comprises a subtractor for subtracting corresponding pixels of the same color component of said first digital image from said second digital image, an absolute value circuit for calculating an absolute value of the difference of said first and second digital images and scaling means for accentuating said difference for display.

6. A device for selectively blending or comparing at least two digital images within different display windows of a display device on a pixel by pixel basis and selectively displaying a resulting sum or a difference image within a display window of said display device, comprising:

an image frame buffer which is subdivided along window display boundaries into said at least two digital images for display in different display windows of said display device;

at least one color map for each display window for translating digital representations of said digital images into component colors of said digital images;

means for adding said component colors of said digital images on a pixel by pixel basis when a blend mode is specified by a viewer of said display device to produce said sum image and for subtracting said component colors of said digital images on a pixel by pixel basis when a compare mode is specified by said viewer to produce said difference image; and means for converting an output of said adding and subtracting means into an analog signal for display in said display window of said display device.

7. A device as in claim 6, wherein said display window in which said sum and difference images are displayed is one of said different display windows.

8. A device as in claim 6, further comprising a display mode controller for providing separate modes of display for each display window of said display device.

9. A device as in claim 6, wherein said adding and subtracting means comprises a blender/comparator for each of said component colors, each blender/comparator blending a component color from a first digital image with the same component color of a second digital image into a sum for each component color on a pixel by pixel basis when in said blend mode and subtracting said component color from said first digital image from the same component color of said second digital image to produce said difference image for each component color on a pixel by pixel basis when in said compare mode.

10. A device as in claim 9 wherein each blender/comparator comprises blender circuitry including a digital logic circuit for passing each digital image to an output if so specified by said viewer, pixel adding means for adding corresponding pixels of the same color component from each digital image which is to be passed to said output, and clamping means for clamping a sum output of said pixel adding means to prevent oversaturation of the resulting image, and comparator circuitry including a subtractor for subtracting corresponding pixels of the same color component of said first digital image from said second digital image, an absolute value circuit for calculating the absolute value of the difference of said first and second digital images and scaling means for accentuating said difference for display.

11. A device as in claim 10, further comprising a switch for selecting said blender circuitry for processing said digital images in said blend mode and for selecting said comparator circuitry for processing said digital images in said compare mode.

12. A device as in claim 11, further comprising a mode decoder for providing a select signal to said switch for selecting said blender circuitry in said blend mode and said comparator circuitry in said compare mode.

13. A method of comparing at least two digital images within different display windows of a display device on a pixel by pixel basis and displaying a difference image within a display window of said display device, comprising the steps of:
  subdividing an image frame buffer along window display boundaries into said at least two digital images for display in different display windows of said display device;
  translating digital representations of said digital images into component colors of said digital images using color maps designated for respective display windows of said display device;
  subtracting said component colors of said digital images on a pixel by pixel basis to produce said difference image; and
  converting said difference image into an analog signal for display in said display window of said display device.

14. A method as in claim 13, wherein said subtracting step comprises the steps of subtracting corresponding pixels of the same color component of a first digital image from a second digital image, calculating an absolute value of the difference of said first and second digital images and accentuating said difference for display.

15. A method of selectively blending or comparing at least two digital images within different display windows of a display device on a pixel by pixel basis and selectively displaying a resulting sum or a difference image within a display window of said display device, comprising the steps of:
  subdividing an image frame buffer along window display boundaries into said at least two digital images for display in different display windows of said display device;
  translating digital representations of said digital images into component colors of said digital images using color maps designated for respective display windows of said display device;
  adding said component colors of said digital images on a pixel by pixel basis when a blend mode is specified by a viewer of said display device to produce said sum image;
  subtracting said component colors of said digital images on a pixel by pixel basis when a compare mode is specified by said viewer to produce said difference image; and
  converting a result of said adding and subtracting steps into an analog signal for display in said display window of said display device.

16. A method as in claim 15, wherein said subtracting step comprises the steps of subtracting corresponding pixels of the same color component of a first digital image from a second digital image, calculating an absolute value of the difference of said first and second digital images and accentuating said difference for display.

* * * * *